United States Patent
Bruzzese

[11] 3,882,131
[45] May 6, 1975

[54] PROCESS FOR PREPARING 4,4-DISULPHOXY-DIPHENYL-(2-PRYIDYL)-METHANE DERIVATIVES

[75] Inventor: Tiberio Bruzzese, Milan, Italy

[73] Assignee: SPA - Societa Prodotti Antibiotics S.p.A., Milan, Italy

[22] Filed: Oct. 5, 1973

[21] Appl. No.: 403,978

Related U.S. Application Data

[62] Division of Ser. No. 288,076, Sept. 11, 1972, Pat. No. 3,822,273.

[30] Foreign Application Priority Data
Sept. 17, 1971 United Kingdom............ 43431/71

[52] U.S. Cl... 260/294.8 R; 260/270 R; 260/297 R; 260/293.69; 424/263
[51] Int. Cl.............................. C07d 31/48
[58] Field of Search..... 260/297 R, 294.8 R, 270 R, 260/295 R

[56] References Cited
UNITED STATES PATENTS
| | | | |
|---|---|---|---|
| 2,764,590 | 9/1956 | Kottler et al................. | 260/295 R |
| 3,409,629 | 11/1968 | Biel et al...................... | 260/297 R |
| 3,558,643 | 1/1971 | Pala............................. | 260/297 R |

OTHER PUBLICATIONS
Fieser & Fieser, Reagents for Organic Synthesis, Pages 376, 422, 451, Vol. 1, John Wiley & Sons Publishers, (1967) QD 262.F5.

Primary Examiner—Alan L. Rotman
Attorney, Agent, or Firm—Wenderoth, Lind & Ponack

[57] ABSTRACT

There is provided a new process for the preparation of 4,4'-disulphoxy-diphenyl-(2-pyridyl)-methane derivatives of the general formula:

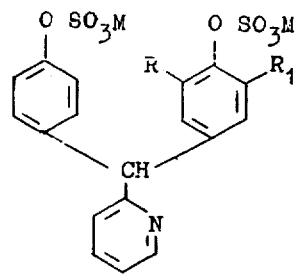

wherein M is an inorganic or organic cation and R and $R_1$, which may be the same or different, are hydrogen or halogen atoms or alkyl, aralkyl or aryl radicals. Those compounds in which R and $R_1$ are not both hydrogen atoms are new.

5 Claims, No Drawings

PROCESS FOR PREPARING 4,4-DISULPHOXY-DIPHENYL-(2-PRYIDYL)-METHANE DERIVATIVES

This is a division of application Ser. No. 288,076, filed Sept. 11, 1972, now U.S. Pat. No. 3,822,273 dated July 2, 1974.

BACKGROUND OF THE INVENTION

The need for efficient cathartic compounds is well known but many of the cathartic compositions at present available suffer from numerous disadvantages, such as producing an irritating effect, especially in the colonic and rectal regions of the intestinal tract, and of having a comparatively low solubility, which renders administration more difficult and frequently necessitates particular forms of formulation of the known cathartic compounds. Furthermore, many of the known cathartic compounds have an insufficient stability at the pH values prevailing in the gastro-intestinal tract, which reduces their efficacity.

Consequently, there is a need for new cathartic compounds which do not suffer from the disadvantages of the previously known and used cathartic compounds and, accordingly, it is an object of the present invention to provide such new cathartic compounds.

A further object of the present invention is to provide a new and improved process for the preparation of cathartic compounds.

Another object of the present invention is to provide pharmaceutical compositions containing the cathartic compounds of the present invention.

SUMMARY OF THE INVENTION

According to the present invention there is provided a process for the preparation of compounds of the general formula:

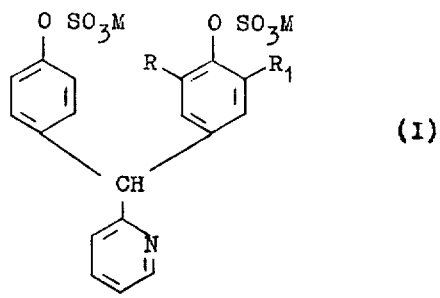

(I)

wherein M is an inorganic or organic cation, and R and $R_1$, which are the same or different, are halogen or hydrogen atoms or alkyl, aralkyl or aryl radicals. Those compounds of general formula (I) in which R and $R_1$ are not both hydrogen atoms are new compounds.

DETAILED DESCRIPTION OF THE INVENTION

When R and/or $R_1$ is an alkyl radical, it preferably contains up to six carbon atoms, for example, a methyl, ethyl, n-propyl, isopropyl, n-butyl, isobutyl, n-pentyl or n-hexyl radical. When R and/or $R_1$ is an aralkyl radical, it is preferably an alkyl radical as defined above in which a hydrogen atom has been replaced by an aryl radical; examples of such aralkyl radicals include benzyl and phenethyl radicals. Finally, when R and/or $R_1$ is an aryl radical, it is preferably a phenyl or naphthyl radical.

As cation M, it is preferred to use an alkali metal or alkaline earth metal cation, for example, lithium, sodium, potassium, calcium, aluminium or magnesium, or a cation derived from a non-toxic amine, for example, methylamine, diethylamine or piperidine.

These compounds (I) have an outstanding laxative action, even when administered in very low doses, and have a negligible toxicity.

The synthesis hitherto used for preparing unsubstituted 4,4'-disulphoxy-diphenyl-(2-pyridyl)-methane (I, R = $R_1$ = H) comprises reacting 2-pyridylaldehyde with excess phenol in the presence of a condensing agent, for example, concentrated sulphuric acid, followed by the hemiesterification of both hydroxyl groups using a reactive derivative of sulphuric acid, for example, chlorosulphonic acid or a sulphur trioxide-tertiary organic base complex, the reaction preferably being carried out in an inert polar organic solvent of the aprotic type. A variation of this process comprises condensing 2-pyridylaldehyde with mono- or di-o-halophenols, followed by the esterification process, to give products of the general formula:

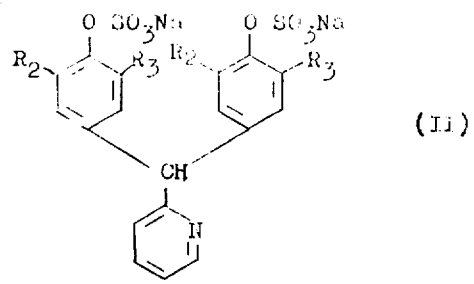

(II)

wherein $R_2$ is a halogen atom and $R_3$ is a hydrogen or halogen atom, and subsequent dehalogenation to give the required compound (I, R = $R_1$ = H). No mention is made in literature of any pharmacological action, in particular a laxative action, of the intermediates of general formula (II).

A considerable disadvantage of the above-described process is that it can only be used to produce derivatives of general formula (II), i.e., symmetrical compounds with regard to the substitution of the benzene nuclei, only one type of o-substituted phenol being utilisable for the condensation with 2-pyridylaldehyde.

The method of synthesis according to the present invention comprises carrying out the condensation in two stages: first, p-hydroxyphenyl-(2-pyridyl)-methanol is prepared with an appropriately protected hydroxyl group, for example, in the form of the p-methoxy derivative:

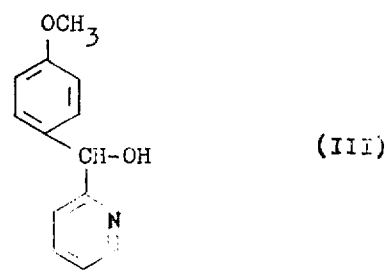

(III)

which can be prepared by a Grignard reaction between p-methoxy-phenyl magnesium bromide (p-bromoanisole and magnesium in ether) and 2-pyridylaldehyde.

The compound (III) is then reacted with an appropriate phenol of the general formula:

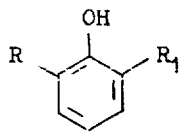

(IV)

wherein R and R₁ have the same meanings as above, in the presence of a condensation agent, such as concentrated sulphuric acid, to give a compound of the general formula:

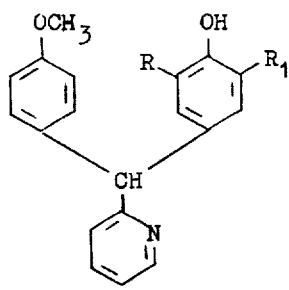

(V)

wherein R and R₁ have the same meanings as above, which is then demethylated, for example, by heating with sulphuric acid or with hydrobromic acid, to give an asymmetric compound of the general formula:

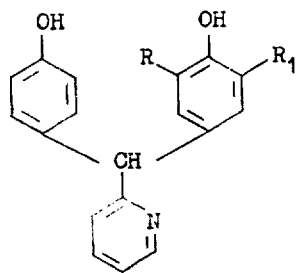

(VI)

wherein R and R₁ have the same meanings as above, which is then esterified with sulphuric acid and thereafter neutralised with a non-toxic inorganic or organic base to give a compound of general formula (I).

The compound (VI) can also be prepared by reacting 2-pyridyl-aldehyde with an o-substituted p-methoxyphenyl magnesium bromide to give a carbinol, which is, in turn, condensed with phenol and thereafter demethylated.

This final esterification step can be carried out, for example, by esterification with chlorosulphonic acid or with appropriate addition compounds (molar ratio 1:1) between sulphur trioxide and various tertiary organic bases, for example, pyridine, triethylamine or the like.

This reaction can be carried out in an anhydrous polar aprotic solvent, for example, pyridine, the use of such a solvent having been shown to be indispensable especially if the sulphonating agent used is chlorosulphonic acid, because this reagent is particularly sensitive to the protic solvents and, for example, in an aqueous medium it immediately hydrolyses and does not produce even a trace of the desired ester. A further advantage of using pyridine is that it has an excellent solvent power and acts, at the same time, as an acceptor of the hydrogen chloride formed during the reaction.

When, on the other hand, the sulphonating agent used is an addition compound of sulphur trioxide with a tertiary organic base, as well as using the same solvents mentioned above, for example, pyridine, water is preferably employed as solvent because these addition compounds are much more stable to hydrolysis than chlorosulphonic acids and the esterification proceeds with good yields, even in aqueous phase buffered to a moderately alkaline pH. Thus, a solution of the desired compound is obtained directly in the form of the desired salt. Generally, therefore, the sulphonation reaction is carried out with the use of sulphur trioxide-pyridine in an aqueous medium, which is initially strongly alkaline in order to ensure solubilisation of the diphenol (VI), and then at a pH which is more moderately alkaline (pH 8 – 10): such a procedure avoids the use of chlorosulphonic acid, which is difficult to handle because of its extremely corrosive nature. It also has the marked economic advantage of avoiding the use of expensive organic solvents, for example, anhydrous pyridine, and finally, it permits a very smooth operation because it is possible to use the aqueous solution obtained from the preparation of (VI), without isolation of this intermediate, by means of neutralisation with sodium hydroxide.

The reaction can be carried out within a wide range of temperatures, for example 20° – 80°C. and preferably 30° – 60°C., with the heating for 1 – 12 hours, depending upon the nature of the substituents R and R₁.

The isolation of the final sulphuric ester (I), for example in the form of the disodium salt, is carried out by adjusting the pH to about 7.5, evaporating to dryness by distillation under reduced pressure and then extracting the compound from the resulting residue, which has a large content of mineral salts, with an appropriate solvent, for example ethanol. The same solvent can generally be used for re-crystallisation of the product, if desired.

It is particularly interesting to observe that when R and R₁ in the compounds of general formula (I) are easy to eliminate and to replace by hydrogen atoms in an aqueous medium where there is a high solubility and in alkaline conditions, where there is a maximum stability of the compounds (I), the above-described process can also be used for the preparation of the 4,4'-disulphoxy-diphenyl(2-pyridyl)-methane unsubstituted in the nucleus, which has the advantage of combining this preparation with that of compounds of general formula (I), substituted in the nucleus. This is the case when R and/or R₁ are halogen atoms: the corresponding compound (I) can be easily dehalogenated, if desired, to give the corresponding unsubstituted compound.

As is known from the literature, these dehalogenations are easily carried out by hydrogenation with appropriate reducing agents, for example, powdered aluminium and aluminium alloys or similar metals in an aqueous ambient and at an alkaline pH. The process is particularly easy to carry out because, for this dehalogenation, there can be used the alkaline aqueous solution obtained during the preparation of the compound (I) substituted in the nucleus, without isolation of this product.

Replacing substituents R and $R_1$ with hydrogen atoms has proved unsuitable when the reaction has to be carried out in an acidic aqueous medium because of the instability of the sulphuric esters or in apolar organic solvents because of the insolubility of the compounds (I).

The laxative activity of the new compounds has been studied with the usual techniques, which indicate the modifications induced on intestinal kynesis, as well as on the quantity, consistency and the water content of the faeces. Some compounds have shown to be of considerable interest and have a high degree of activity in the various tests used. Thus, for example, 3-chloro-4,4'-disulphoxydiphenyl-(2-pyridyl)-methane bisodium salt, has an $ED_{100}$ (minimum dose for obtaining 100% of diarrhoeic animals) equal to about 10 mg/kg after oral administration. The toxicity of this compound by the oral route was virtually negligible: in rats and mice, the $LD_{50}$ was >3,000 mg/kg.

Since the compounds do not modify the intestinal propulsion of a charcoal meal in the small intestine, while markedly reducing the transit time in the gastro-enteric tract as a whole, it follows that they exert their action mainly in the large intestine.

Preliminary clinical trials have confirmed the good activity of the compounds, even in subjects with a partial addiction to laxatives of similar diphenolic structure; as in the case of other derivatives in which the diphenolic hydroxyl groups are firmly blocked, even "in vivo," the appearance of gastro-intestinal irritative effects is very rare.

The following Examples are given for the purpose of illustrating the present invention:

EXAMPLE 1

3-Chloro-4-hydroxy-4'-methoxydiphenyl-(2-pyridyl)-methane 20 g. p-methoxyphenyl-(2-pyridyl)-methanol (m.p. 132°C.; obtained from p-bromoanisol and magnesium in ether and reacting the resulting p-methoxyphenyl magnesium bromide with 2-pyridylaldehyde by Grignard's method) are suspended in 80 ml. of 50% by weight sulphuric acid. 20 g. o-chlorophenol are carefully added thereto and the reaction mixture is stirred at the boiling point for 6 hours. The reaction mixture is then cooled, added to 200 ml. water and the pH is adjusted to 6 by adding a 10% solution of sodium hydroxide. The suspended solid material is filtered off, thoroughly washed with water and dried to give the desired product in high yield. If necessary, this product can be recrystallised from ethanol-water (1:1), the solution being decolorised by heating with charcoal. After cooling, 3-chloro-4-hydroxy-4'-methoxydiphenyl-(2-pyridyl)-methanol precipitates in the form of a colourless, crystalline solid, melting at 158° – 159°C.

Analysis: for $C_{19}H_{16}Cl NO_2$
| | C | H | Cl | N |
|---|---|---|---|---|
| found: | 69.88%; | 4.99%; | 10.85%; | 4.33% |
| calculated | 70.04%; | 4.95%; | 10.88%; | 4.30%. |

EXAMPLE 2

3-Chloro-4,4'-dihydroxydiphenyl-(2-pyridyl)-methane

A mixture of 5 g. 3-chloro-4-hydroxy-4'-methoxydiphenyl-(2-pyridyl)-methane and 25 ml. 50% by volume sulphuric acid is heated under reflux, while stirring, for 48 hours. After cooling, it is carefully added to 100 ml. iced water which has been rendered alkaline by adding a 10% solution of sodium hydroxide. The solution obtained is filtered to remove any insoluble material and decolorised with charcoal. The pH is then adjusted to neutrality (pH 6 – 7) by adding 10% sulphuric acid. A copious precipitate is formed which is collected by filtration, washed with water and dried. After recrystallisation from methanolisopropanol, 3-chloro-4,4'-dihydroxydiphenyl-(2-pyridyl)-methane is obtained as a colourless, crystalline solid, which melts at 215° – 216°C.

Analysis: for $C_{18}H_{14}Cl NO_2$
| | C | H | Cl | N |
|---|---|---|---|---|
| found: | 69.50%; | 4.52%; | 11.28%; | 4.46% |
| calculated | 69.34%; | 4.53%; | 11.37%; | 4.49%. |

EXAMPLE 3

3-Chloro-4,4'-dihydroxydiphenyl-(2-pyridyl)-methane

A mixture of 20 g. p-methoxyphenyl-(2-pyridyl)-methanol, 100 ml. of 50% by weight sulphuric acid and 20 g. o-chlorophenol is carefully heated under reflux for 6 hours. After cooling somewhat, 30 ml. 48% hydrobromic acid are added and the reaction mixture is maintained at the boil for 18 hours. After cooling and diluting with water, the reaction mixture is rendered alkaline with 10% sodium hydroxide solution. The alkaline solution thus obtained is treated in the manner described in Example 2 to give, after neutralisation, a high yield of 3-chloro-4,4'-dihydroxydiphenyl-(2-pyridyl)-methane.

EXAMPLE 4

3-Chloro-4,4'-dihydroxydiphenyl-(2-pyridyl)-methane

A mixture of 10 g. p-methoxyphenyl-(2-pyridyl)-methanol, 40 ml. of 50% by weight sulphuric acid and 10 g. o-chlorophenol is boiled for 6 hours. It is then cooled somewhat, 10 ml. concentrated sulphuric acid are carefully added and the reaction mixture then heated under reflux for 48 hours. After cooling, it is carefully poured into iced water and brought to pH 6 with 10% sodium hydroxide solution. A copious, technically pure precipitate of 3-chloro-4,4'-dihydroxydiphenyl-(2-pyridyl)-methane is obtained.

EXAMPLE 5

3-Chloro-4,4'-disulphoxydiphenyl-(2-pyridyl)-methane 10 g. 3-chloro-4,4'-dihydroxydiphenyl-(2-pyridyl)-methane are dissolved in 50 ml. pyridine. There are then added 12.8 g. of an addition compound of sulphur trioxide and pyridine (molar ratio 1:1), obtained by bubbling sulphur trioxide directly into pyridine and subsequent filtration of the resulting precipitate. The reaction mixture is maintained for 2 hours at ambient temperature and then at 45°C. for 4 hours, in order to complete the reaction. The solution is then concentrated by distilling off the pyridine under reduced pressure and temperature and the residue is treated with 10% sodium hydroxide solution, while cooling, to give a weakly alkaline solution. The pH of the solution is then adjusted to 7.5 and the solution is decolorised with charcoal and evaporated to dryness at a temperature of about 50°c., under reduced pressure. The residue is then crystallised with boiling ethanol and decolorised by heating with charcoal, to give a high yield of 3-chloro-4,4'-disulphoxydiphenyl-(2-pyridyl)-methane in the form of its disodium salt. The product is a colourless, crystalline solid which is very soluble in water and has a melting point of 181° – 183°C. (decomposition).

Analysis: for $C_{18}H_{12}Cl\,NO_8S_2Na_2$
found:    42.03%; H 2.35%; Cl 6.84%; N 2.70%; S 12.48%
          Na 8.94%
calculated: C 41.92%; H 2.34%; Cl 6.87%; N 2.71%; S 12.43%
          Na 8.91%

When using a 10% potassium hydroxide solution or a 10% lithium hydroxide solution instead of a 10% sodium hydroxide solution, there are obtained, respectively, the corresponding dipotassium and dilithium salts.

EXAMPLE 6

3-Chloro-4,4'-disulphoxydiphenyl-(2-pyridyl)-methane 5 g. 3-chloro-4,4'-dihydroxydiphenyl-(2-pyridyl)-methane are dissolved in a minimum quantity of 4% sodium hydroxide solution, then heated to 45°C. and 16 g. of an addition compound of sulphur trioxide and pyridine (molar ratio 1:1) are added portionwise, while stirring, in the course of 2 hours. During the addition, the reaction mixture is maintained in solution, initially at a pH of about 10 and then at a pH of about 8, by adding, at intervals, 4% sodium hydroxide solution. It is then stirred overnight at ambient temperature, the pH is adjusted to 7.5 and any unreacted material is filtered off. The alkaline solution thus obtained is decolorised with charcoal, evaporated to dryness and worked up in the manner described in Example 5 to give the disodium salt of 3-chloro-4,4'-disulphoxy-diphenyl-(2-pyridyl)-methane.

EXAMPLE 7

3-Chloro-4,4'-disulphoxy-diphenyl-(2-pyridyl)-methane

A solution of 5 g. 3-chloro-4,4'-dihydroxydiphenyl(2-pyridyl)-methane in 50 ml. anhydrous pyridine is cooled to about 0° to +5°C. and then, while stirring, 5 g. chlorosulphonic acid are added dropwise in the course of half an hour. The reaction mixture is maintained for 24 hours at ambient temperature, while stirring, whereafter the solvent is distilled off under vacuum and at a reduced temperature. The residue obtained is treated with 10% sodium hydroxide solution, pre-cooled with ice, to give a weakly alkaline pH (about 7.5). The solution obtained is washed with chloroform, decolorised with charcoal, filtered and evaporated to dryness at a reduced temperature and pressure. The residue is then extracted with 300 ml. boiling ethanol, divided into 2 portions, in order to separate the inorganic salts, taking care not to overboil so as to avoid the possible transesterification, with the solvent, of the sulpho group of the ester formed. After decolorisation of the ethanol extract with charcoal and concentration to incipient turbidity, followed by slow crystallisation with cooling, there is obtained a high yield of 3-chloro-4,4'-disulphoxy-diphenyl-(2-pyridyl)-methane disodium salt.

EXAMPLE 8

3-Chloro-4,4'-disulphoxy-diphenyl-(2-pyridyl)-methane

3-Chloro-4,4'-dihydroxydiphenyl-(2-pyridyl)-methane is prepared in the manner described in Example 4 but, at the end of the heating phase, the sulphuric acid reaction mixture is diluted with 100 ml. water, washed thoroughly with ether and subsequently rendered alkaline with 10% sodium hydroxide solution to complete redissolving of the precipitate formed around neutrality. The resulting solution is filtered to remove any traces of unreacted material and any precipitated inorganic salts and decolorised with charcoal and heated to 45°C. While stirring and in the course of 2 hours, 50 g. of an addition compound of sulphur trioxide and pyridine are added portionwise, the pH of the reaction mixture being first maintained at about 10 and then at about 8 by adding sodium hydroxide, in order to maintain the mixture in solution. The mixture is stirred overnight at ambient temperature, the pH is adjusted to 7.5 and any unreacted material is filtered off. The resulting alkaline solution is decolorised with carbon, evaporated to dryness and worked up in the manner described in Example 5, to give the disodium salt of 3-chloro-4,4'-disulphoxy-diphenyl-(2-pyridyl)-methane.

EXAMPLE 9

4,4'-Disulphoxy-diphenyl-(2-pyridyl)-methane 10 g. 3-chloro-4,4'-disulphoxy-diphenyl-(2-pyridyl)-methane disodium salt are dissolved in 65 ml. 10% sodium hydroxide solution. While stirring, 5 g. powdered nickel-aluminium alloy (1:1) are added to dehalogenate the compound. The alloy is added portionwise over the course of about 2 hours and at ambient temperature. The reaction mixture is stirred overnight and the suspended solid material is removed by filtration. The solution is then decolorised with charcoal and the pH is reduced to 7.5 – 8 by adding diluted sulphuric acid. Any precipitate formed is filtered off.

The resulting solution is dried by distillation under vacuum and at reduced temperature. The residue is extracted by boiling with 500 ml. ethanol, divided into 2 portions. After decolorisation with charcoal and concentration of the alcohol extract under reduced pressure and at a temperature of about 40°C. up to incipient turbidity, it is left to cool and crystallise. The precipitate is collected by filtration and dried to give a high yield of 4,4'-disulphoxy-diphenyl-(2-pyridyl)-methane disodium salt in the form of a colourless, crystalline solid with a melting point of 273° – 275°C. (decomposition).

Analysis: for $C_{18}H_{13}NO_8S_2Na_2$
found:      C 45.12%; H 2.73%; N 2.88%; S 13.24%; Na 9.60%
calculated:   44.95%;   2.72%;   2.91%;   13.31%;   9.55%.

EXAMPLE 10

4,4'-Disulphoxy-diphenyl-(2-pyridyl)-methane

A mixture of 20 g. p-methoxyphenyl-(2-pyridyl)-methanol, 80 ml. 50% by weight sulphuric acid and 20 g. o-chlorophenol is boiled for 6 hours. It is then cooled somewhat and 20 ml. concentrated sulphuric acid are carefully added thereto, followed by heating under reflux for 48 hours. After cooling, the reaction mixture is carefully poured into iced water, washed thoroughly with ether and rendered alkaline with 10% sodium hydroxide solution up to redissolving of the precipitate around neutrality. The resulting solution is filtered, decolorised with charcoal and heated to 45°C. There are then added portionwise, while stirring and in the course of 6 hours, 100 g. of an addition compound of sulphur trioxide and pyridine, the pH being maintained first at about 10 and then gradually adjusted to 8 by adding sodium hydroxide in order to maintain the mixture in solution. The reaction mixture is left to stand overnight at ambient temperature, filtered and 100 ml. of 10% sodium hydroxide solution are added. To this solution are added, in the course of 4 hours, while stirring and at ambient temperature, 30 g. powdered nickel-aluminium alloy (1:1), divided into small portions. The mixture is stirred overnight, the solid in suspension is then filtered off, the pH of the filtrate is reduced to 7.5 – 8 with sulphuric acid and the precipitate filtered off. The solution is evaporated to dryness under reduced pressure and the solid residue is extracted portionwise with 1 litre of boiling ethanol to remove inorganic salts. The alcohol extract is decolorised with charcoal, concentrated to a small volume under vacuum and at a temperature of about 40°C., then diluted with isopropanol and left to crystallise to give, by crystallisation, the desired disodium salt of 4,4'-disulphoxy-diphenyl-(2-pyridyl)-methane.

The novel compositions of the present invention contain at least one active compound (I), together with a pharmaceutically acceptable carrier. The term "pharmaceutically acceptable carrier" as used herein in reference to the compositions of the present invention means a solid or liquid composed of a single substance or a number of substances which may be solids, liquids or a combination of solids and liquids. The concentration of active ingredient in the composition is not critical but, for economy of preparation, should be at least 0.3% by weight and is preferably 0.5 – 2.0% by weight. These compositions can be administered either orally, rectally or parenterally to human subjects and are generally administered in an amount sufficient to give 25 to 250 mg. of active substance per day. For oral administration, there can be used any conventional type of tablets, lozenges, capsules, dragees, pills and powders; for parenteral administration, aqueous and non-aqueous solutions or suspensions are appropriate and for rectal administration there can be used any conventional type of suppository base, such as glycerol, cocoa butter and the like. The new compounds can also be used in solutions which are appropriate for rectal instillation. Acceptable pharmaceutical carriers include gelatine capsules, sugars, such as lactose or sucrose, starches, such as corn starch or potato starch, cellulose derivatives, such as sodium carboxymethyl cellulose, ethyl cellulose, methyl cellulose or cellulose acetate phthalate, gelatin, talc, calcium phosphates, such as dicalcium phosphate or tricalcium phosphate, sodium sulphate, calcium sulphate, polyvinyl pyrrolidone, acacia, polyvinyl alcohol, stearic acid, alkaline earth metal stearates, such as magnesium stearate, vegetable oils, such as groundnut oil, cottonseed oil, sesame oil, olive oil, corn oil and oil of theobroma, water, agar, alginic acid, benzyl alcohol, isotonic saline and phosphate buffer solutions, as well as other non-toxic, compatible substances used in pharmaceutical formulations.

The following Example illustrates pharmaceutical compositions according to the present invention:

EXAMPLE 11

250 mg. tablets are prepared containing:

| | |
|---|---|
| 3-chloro-4,4'-disulphoxydiphenyl-(2-pyridyl)-methane disodium salt | 25 mg. |
| starch | 150 mg. |
| lactose | 70 mg. |
| magnesium stearate | 5 mg. |

The composition described in Example 11 is intended for oral administration to humans for the relief of constipation.

I claim:

1. A process for the preparation of a 4,4'-disulphoxydiphenyl-(2-pyridyl)-methane compound of the formula

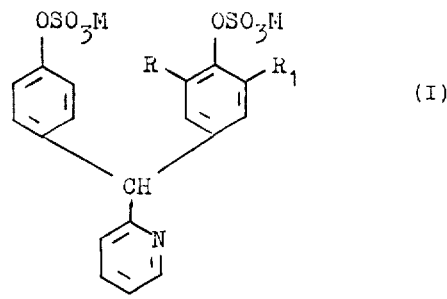

(I)

wherein M is a cation selected from the group consisting of alkali metal, alkaline earth metal, aluminium and non-toxic amine cations and R and R₁, which are the same or different, are hydrogen, halogen, alkyl of 1 – 6 carbon atoms, phenyl, naphthyl, benzyl or phenethyl, which comprises (1) condensing p-methoxyphenyl-(2-pyridyl)-methanol with a phenol of the formula

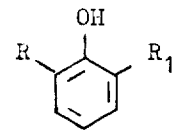

wherein R and R₁ have the same meanings as above, in the presence of sulphuric acid to yield a compound of the formula

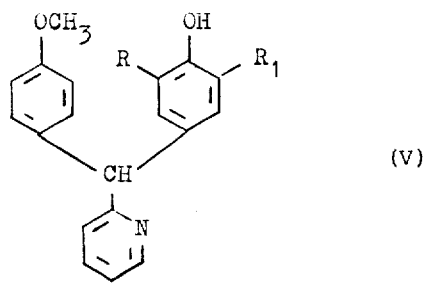

(V)

wherein R and R₁ have the same meanings as above, (2) demethylating the compound V to yield an asymetric compound of the formula

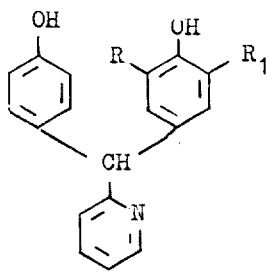

(VI)

wherein R and R₁ have the same meanings as above, (3) esterifying the compound VI to yield the dihemisulphate ester and (4) neutralizing the ester with a basic alkali metal compound, alkaline earth metal compound, aluminium compound or a non-toxic amine.

2. The process according to claim 1, wherein all the reaction steps are carried out in an aqueous medium.

3. The process according to claim 1, wherein the compound I is obtained in which at least one of R and R₁ is a halogen atom, and the compound I is dehalogenated.

4. The process according to claim 3, wherein all the reaction steps are carried out in an aqueous medium.

5. The process according to claim 1, wherein the p-methoxy-phenyl-(2-pyridyl)-methanol is prepared by reacting 2-pyridyl-aldehyde with p-methoxy-phenol magnesium bromide.

* * * * *